United States Patent
Lissner et al.

(10) Patent No.: US 6,735,966 B2
(45) Date of Patent: May 18, 2004

(54) METHOD FOR REGULATING AN AIR-CONDITIONING DEVICE HAVING A FRESH AIR AND A CIRCULATING AIR SUPPLY

(75) Inventors: Andreas Lissner, Sindelfingen (DE); Markus Schoellhorn, Sindelfingen (DE); Wolfgang Straub, Deggingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/183,537

(22) Filed: Jun. 28, 2002

(65) Prior Publication Data

US 2003/0005712 A1 Jan. 9, 2003

(30) Foreign Application Priority Data

Jul. 6, 2001 (DE) .......................... 101 32 377

(51) Int. Cl.[7] .............. F25D 17/00; F24F 7/00
(52) U.S. Cl. ............... 62/179; 236/493; 62/236; 62/60
(58) Field of Search ............... 62/179, 236, 60; 236/493

(56) References Cited

U.S. PATENT DOCUMENTS

| | | | | |
|---|---|---|---|---|
| 4,843,826 A | * | 7/1989 | Malaker | 62/6 |
| 4,870,833 A | * | 10/1989 | Matsuda et al. | 62/134 |
| 5,582,234 A | * | 12/1996 | Samukawa et al. | 165/204 |
| 5,700,191 A | * | 12/1997 | Nieling et al. | 454/69 |
| 5,907,954 A | * | 6/1999 | Kettner | 62/90 |
| 5,934,987 A | | 8/1999 | Baruschke et al. | |
| 5,937,664 A | * | 8/1999 | Matsuno et al. | 62/259.2 |
| 5,971,287 A | | 10/1999 | Kettner et al. | |
| 6,089,034 A | * | 7/2000 | Lake et al. | 62/204 |
| 6,155,492 A | * | 12/2000 | Hinterwaller et al. | 236/51 |

FOREIGN PATENT DOCUMENTS

| | | |
|---|---|---|
| DE | 196 08 015 C1 | 5/1997 |
| DE | 196 37 232 A1 | 3/1998 |
| EP | 0203052 | 1/1981 |
| EP | 0407388 B1 | 1/1991 |
| EP | 0825044 A2 | 2/1998 |

OTHER PUBLICATIONS

German Office Action.

* cited by examiner

*Primary Examiner*—Melvin Jones
*Assistant Examiner*—Mark Shulman
(74) *Attorney, Agent, or Firm*—Crowell & Moring LLP

(57) ABSTRACT

A method for automatically controlling an air conditioning device includes determining vehicle interior and exterior temperatures, and supplying a mixture of fresh air and circulating air to the air conditioning device in a hot start when the interior temperature exceeds the exterior temperature. An air conditioning device for a motor vehicle includes a hot start mode and a normal mode. In the hot start mode when the vehicle interior temperature exceeds the vehicle exterior temperature, a mixture of fresh air and circulating air is supplied to the air conditioning device. The air conditioning device operates in the normal mode when the vehicle exterior temperature exceeds the vehicle interior temperature.

2 Claims, 1 Drawing Sheet

METHOD FOR REGULATING AN AIR-CONDITIONING DEVICE HAVING A FRESH AIR AND A CIRCULATING AIR SUPPLY

This application claims the priority of German Patent Document 101 32 377.8, filed Jul. 6, 2001, the disclosure of which is expressly incorporated by reference herein.

BACKGROUND AND SUMMARY OF THE INVENTION

The invention relates to a method for regulating an air-conditioning device having a fresh-air and a circulating-air supply.

EP 0 407 388 B1 describes a method for regulating an air-conditioning device having a fresh-air and a circulating-air supply. The air-conditioning device, which can optionally be operated in the fresh-air and circulating-air mode, has a "circulating-air mode" position. The air-conditioning system, after the motor-vehicle engine has been started, is initially operated for a short period in the fresh-air mode, and then the period for the fresh-air mode is prescribed by a timing element.

Similarly, EP 0 023 052 discloses a method for setting the fresh-air/circulating-air flap, in which the internal and external temperatures are determined and, when the external temperature is cooler, switching over to the fresh-air mode takes place for more rapid cooling. The switching is always between the fresh-air or circulating-air mode. However, there is no mixed-air mode.

In contrast, EP 0 825 044 A2 discloses a mixed-air regulating control for a heating/air-conditioning system of a motor vehicle. However, a general regulating control for optimizing the power consumption is described. The external-air and/or circulating-air supply is set in such a manner that the dew point temperature of the spatial air in the vehicle is lower than the temperature on the inside of a vehicle window.

This type of method for the automatic control of the fresh-air/circulating-air flap to increase the cooling power in vehicle heating and air-conditioning systems is disadvantageous in that although fresh air is conducted into the vehicle interior for a prescribed period, after switching over to circulating air the switching-over of the air-conducting means causes a large noise under some circumstances. In addition, the switching-over takes place after a prescribed period and is not matched to the prevailing temperature conditions, such as internal temperature and external temperature.

The object of the invention is to improve the switching of the circulating-air/fresh-air flap in such a manner that a more rapid cooling of the vehicle interior takes place and, in the process, to optimize the noise changes in the vehicle interior.

The object is achieved by the invention described hereinafter.

A substantial advantage of the present invention is that the switching of the fresh air/circulating air takes place as a function of the prevailing temperature conditions outside and within the vehicle. This leads to optimum and rapid cooling of the vehicle, in particular in the case of a hot start with a high air throughput. Cooler air is introduced from the external region into the vehicle interior which does not have to be additionally cooled. In addition, when switching over to full circulating air, the noise irritation is low, because the circulating-air flap has already been partially opened and has not moved from the rest position. The switching-over to circulating air is unnoticeable to the vehicle occupants.

BRIEF DESCRIPTION OF THE DRAWINGS

The invention will be explained in greater detail with reference to an exemplary embodiment in conjunction with a description of the figures, in which.

DETAILED DESCRIPTION OF THE DRAWINGS

Figure 1:
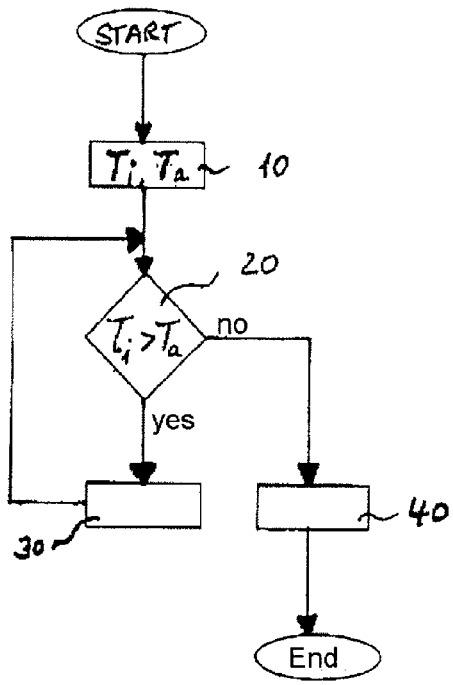
FIG. 1 shows a diagram for setting the fresh-air/circulating-air flap.

FIG. 1 shows a diagram for the method sequence of setting the fresh-air and circulating-air supply into the vehicle interior. In the case of a hot start, if air-conditioning of the vehicle interior is desired, for example in summer when a vehicle has stood in the sun and the interior has heated up severely, following an ignition start, the external temperature Ta and the internal temperature Ti are read in at 10. It is then determined at 20 whether the internal temperature Ti exceeds the external temperature Ta. If this is the case, a higher content of fresh air is blown into the vehicle interior at 30 for more rapid cooling. This content of fresh air is approximately 30%. The determination at 20 is repeated until the condition at 20 is no longer fulfilled and the internal temperature Ti is less than the external temperature Ta. When the external temperature Ta is greater than the internal temperature Ti, the automatic setting of the circulating air is then activated at 40.

This method has the advantage that in the case of a hot start, after the air-conditioning is set, the switching-over to a complete content of circulating air can take place with a reduced noise level or virtually without any noise change, since a partial circulating-air supply has already taken place. The fresh air is taken in in front of the end wall and a switching-over of the fresh-air flap is therefore hardly perceived by the occupant. The circulating air is taken in in the vehicle interior, conventionally in the foot well. A switching-over of the circulating-air flap therefore may cause a change in the noise level inside the vehicle. If the internal temperature has been appropriately equalized, switching to the general regulating device takes place, which device sets a maximum circulating-air supply at a high external temperature which requires cooling of the fresh air taken in. The movement of the circulating-air flap under those conditions produces virtually no noise change in the vehicle interior, since a circulating-air supply has already partially taken place. In contrast, the fresh-air supply is stopped by setting the fresh-air intake. The occupant does not notice the switching-over from the additional fresh-air intake to the general regulating device with complete circulating-air intake.

Figure 2:
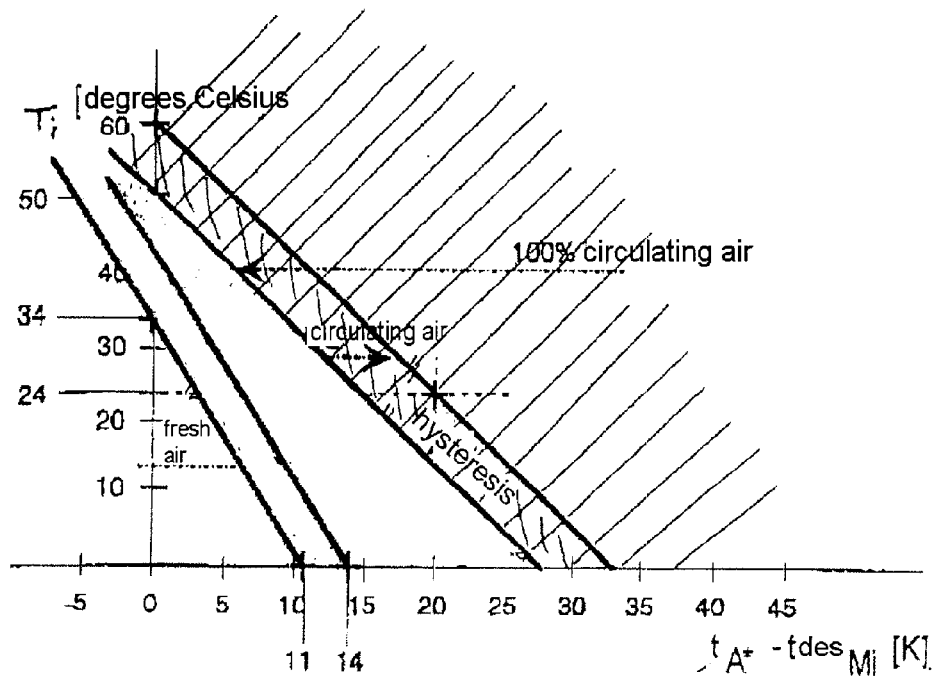
FIG. 2 shows a graph for the setting of the fresh-air/circulating-air supply in the automatic regulating mode.

FIG. 2 shows a graph for the setting of the fresh-air/circulating-air supply under "normal" switching conditions for the fresh-air/circulating-air supply. The internal temperature is represented on the y-axis, and the x-axis represents the difference between the external temperature $T_A^*$ and average desired value for the temperature $tdes_{Mi}$. The average desired value is the temperature typically desired by the occupant. Two dark bars are shown in each case, with the hatched region representing the region with 100% circulating air. If the air-conditioning device is actually set at 100% circulating air (hatched region) during a hot start, the internal temperature and the external temperature are ascertained and compared as shown in FIG. 1. If the internal temperature is greater than the external temperature, a relatively large content of fresh air is nevertheless taken in. If the internal temperature is then lower than the external temperature, the "normal" switching conditions illustrated here again apply. Under "normal" switching conditions, 100% circulating air, or if the conditions are satisfied, also at 70% or 80% circulating air is supplied, or else 100% fresh air is supplied. The "normal" switching conditions for the automatic circulating air will be clarified below using an example.

At an internal temperature of 60° C. and an external temperature of 30° C. and an average desired temperature of 22° C., so that 8K is prescribed on the x-axis, there is, according to the graph, 100% circulating-air supply. Since the air-conditioning has just begun operating, the interior continues to cool down. However, switching to a complete fresh-air supply would only take place if the internal temperature dropped to approximately lower than 8° C. This, however, is not generally the case under these conditions, so the air-conditioning device would always be operated at 100% or 70–80% circulating-air supply. However, in the case of the method according to the invention there is a deviation from normal conventional operation (i.e., the "normal" switching conditions) during a hot start. If the internal temperature exceeds the external temperature, a greater content of fresh-air supply is set until the internal temperature has reached the external temperature. There is then a change back to the "normal" switching conditions illustrated here. Thus, at the beginning cooler air which does not have to be cooled first in a complex manner is introduced into the vehicle interior. This brings about a more rapid cooling effect on the vehicle interior, in particular in summer when the vehicle has been heated up when parked in the sun.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An air conditioning device for a motor vehicle, the device comprising a control that includes:

a hot start mode, in which a mixture of fresh air and circulating air is supplied to the air conditioning device, wherein the air conditioning device operates in the hot start mode when the vehicle interior temperature exceeds the vehicle exterior temperature; and a normal mode, wherein the air conditioning device operates in the normal mode when the vehicle exterior temperature exceeds the vehicle interior temperature.

2. The air conditioning device according to claim 1, wherein in the hot start mode, approximately 30% circulating air and approximately 70% fresh air are supplied to the air conditioning device.

* * * * *